United States Patent [19]
Barabino

[11] Patent Number: 4,644,177
[45] Date of Patent: Feb. 17, 1987

[54] FLUID LEVEL AND CONDITION DETECTOR SYSTEM

[75] Inventor: William A. Barabino, North Reading, Mass.

[73] Assignee: Technical Research Associates, North Reading, Mass.

[21] Appl. No.: 687,738

[22] Filed: Dec. 31, 1984

[51] Int. Cl.$^4$ ............................................. G01F 23/28
[52] U.S. Cl. ...................................... 250/577; 73/293; 250/227; 350/96.29
[58] Field of Search .................... 250/227, 577, 231 R, 250/573, 574; 73/293; 356/133, 135, 136; 350/96.29; 340/619

[56] References Cited
U.S. PATENT DOCUMENTS

| | | | |
|---|---|---|---|
| 3,068,697 | 12/1962 | Carlson | 73/293 |
| 3,448,616 | 6/1969 | Wostl et al. | 73/293 |
| 4,256,403 | 3/1981 | Powell | 73/293 |
| 4,311,048 | 1/1982 | Merz | 73/293 |
| 4,443,699 | 4/1984 | Keller | 250/227 |

Primary Examiner—Edward P. Westin
Attorney, Agent, or Firm—Joseph S. Iandiorio; Douglas E. Denninger

[57] ABSTRACT

A fluid level and condition detector system including a multimode optical waveguide for insertion into a medium including at least a first fluid whose level is to be monitored, a source of radiation for introducing into one end of the waveguide radiation in a plurality of modes, and means for detecting the difference in radiation flux transmitted by the waveguide with the waveguide covered by the first fluid over its equilibration length, with the waveguide covered by a second fluid of lower index of refraction over its equilibration length, and with the waveguide covered partially by each fluid over its equilibration length and for detecting the difference in radiation flux transmitted by the waveguide due to the combined effects of the change in index of refraction and change in optical absorption coefficient of the first fluid covering at least a portion of the waveguide.

45 Claims, 6 Drawing Figures

4,644,177

FLUID LEVEL AND CONDITION DETECTOR SYSTEM

FIELD OF INVENTION

This invention relates to a fluid monitoring system, and more particularly to such a system for monitoring the level and condition of a surrounding fluid.

BACKGROUND OF INVENTION

A number of devices are designed to monitor the level of liquids in relatively motionless chambers. Tubular sight glasses have been mounted on the outside of chambers wherein the liquid rises inside the glass to indicate the internal level. Other devices utilize various types of floats that rise or fall according to the liquid level. None of these devices, however, have proved satisfactory for monitoring liquid levels in a chamber subject to motion. Moreover, these devices cannot monitor the condition or quality of the liquid.

In some devices, a light beam is projected across a gap onto a photoelectric sensor which can measure the diminution of light caused by the presence in the gap of a liquid, or the presence of contaminants in gases. Yet other devices utilize spectral absorption properties of particular molecules to identify the presence or absence of those molecules.

Commonly, oil level indicators use thermistors whose conductivity depends on temperature. Resistance within the thermistor increases as oil covers the element and decreases its temperature by conducting heat away from it. The temperature of the thermistor rises, and therefore its resistance declines, as the oil recedes from the element.

SUMMARY OF INVENTION

It is therefore an object of this invention to provide an improved system for monitoring changes in a fluid.

It is a further object of this invention to provide such a system for monitoring fluid level.

It is a further object of this invention to provide such a system for monitoring the condition of a fluid.

It is a further object of this invention to provide such a system for detecting the presence of contaminants in a fluid.

It is a further object of this invention to provide an improved system for monitoring both level and condition of a fluid. It is a further object of this invention to provide such a system using changes in radiation flux within an optical waveguide to indicate changes in condition of a fluid.

It is a further object of this invention to provide such a system using changes in total internal reflection of radiation within an optical waveguide to indicate changes in the level of a surrounding fluid.

It is a further object of this invention to provide a monitoring device that is small, compact and rugged.

It is a further object of this invention to provide such a device that has no moving parts.

It is a further object of this invention to provide such a device that relies on an optical element that obviates problems due to clogging.

It is a further object of this invention to provide such a device to monitor the level and quality of oil or other fluids associated with the operation of a machine.

The invention features a detector system for fluid level, fluid condition, or both. The fluid level detector system includes a multimode optical waveguide for insertion into a medium including at least a first fluid whose level is to be monitored. There is a source of radiation for introducing into one end of the waveguide radiation in a plurality of modes. There are also means for detecting the difference, due to mode stripping resulting from a change in the index of refraction, in radiation flux transmitted by the waveguide with the waveguide covered by the first fluid over its equilibration length, with the waveguide covered by a second fluid of lower index of refraction over its equilibration length, and with the waveguide covered partially by each fluid over its equilibration length.

The fluid condition detector system includes a similar multimode optical waveguide and a source of radiation. It further includes means for detecting the difference in radiation flux transmitted by the waveguide due to the combined effects of the mode stripping resulting from a change in index of refraction and of the evanescent losses resulting from a change in optical absorption coefficient of the fluid covering at least a portion of the waveguide.

The detector system for both fluid level and condition includes a multimode optical waveguide, a source of radiation, and means for detecting the difference in radiation flux transmitted by the waveguide. The detecting means of the combined detector system performs the functions of both the level detecting means and the condition detecting means.

In a preferred embodiment, the detecting means of the fluid level detector system includes a radiation sensor and may include means for determining whether signals from the radiation sensor deviate from a predetermined value. The determining means includes means for comparing sensor signals with a high value and may also include display means for indicating an unsatisfactory level of the first fluid when the sensor signal, due to coverage of the equilibration length by the second fluid, exceeds the high value. The comparing means of the level detector system may also compare sensor signals with a low value. The determining means may also include display means for indicating a full level of the first liquid when the sensor signal, due to coverage of the equilibration length by the first fluid, is less than the low value, and an intermediate level of the first fluid when the sensor signal, due to partial coverage of the equilibration length by the first fluid, is between the high value and the low value.

The detecting means of the fluid condition detector system includes a radiation sensor and may include means for determining whether signals from the radiation sensor deviate from a predetermined value, particularly a low value to which the sensor signal is compared by comparing means. The determining means may also include display means for indicating an unsatisfactory condition of the fluid when the sensor signal, due to an increase in the index of refraction and in the absorption coefficient of the fluid, is less than the low value.

The detecting means of the combined fluid level and condition detector system includes a radiation sensor and may include means for determining whether signals from the radiation sensor deviate from at least one predetermined value. The determining means may include means for comparing sensor signals with a high value and a low value and display means for indicating an unsatisfactory level of the first fluid when the sensor signal, due to coverage of the equilibration length by the second fluid, exceeds the high value, and an unsatisfactory condition of the first fluid when the sensor signal, due to an increase in the index of refraction and in the absorption coefficient of the first fluid, is less than the low value.

The fluid level detector system, the fluid condition detector system, and the fluid level and condition detector systems may include determining means which include a memory for storing the level sensed. The optical waveguides may include glass. The glass may have an absolute refractive index of 1.40 to 1.8 for sodium light of frequency 5893 angstroms. The radiation source may emit radiation having a wavelength selected from the spectra consisting of visible and near-visible radiation. The radiation source may be a light-emitting diode. To permit mounting or other contact with the optical waveguide, a portion of the associated outer surface of the waveguide may be coated with optically reflective material. The radiation sensor may include at least one photoelectric element and may include a phototransistor. In one embodiment, the detector system has the radiation source and the radiation sensor mounted at the same end of the optical waveguide, and optically reflective material mounted at the opposite end. This configuration is desirable when the first fluid, the fluid to be monitored, is engine oil and the second fluid includes atmospheric gases above the oil.

The invention also encompasses a method of detecting fluid level, fluid condition, or both level and condition, including the steps of inserting a multimode optical waveguide into a medium including at least a first fluid whose level is to be monitored, introducing radiation into one end of the waveguide in a plurality of modes, and either detecting the difference, due to mode stripping resulting from a change in the index of refraction, in radiation flux transmitted by said waveguide with the waveguide covered by said first fluid over its equilibration length, with the waveguide covered by a second fluid of lower index of refraction over its equilibration length, and with the waveguide covered partially by each fluid over its equilibration length, or detecting the difference in radiation flux transmitted by the waveguide due to the combined effects of the mode stripping resulting from a change in index of refraction and of evanescent losses resulting from a change in optical absorption coefficient of the first fluid covering at least a portion of the waveguide, or detecting both types of differences.

DISCLOSURE OF PREFERRED EMBODIMENT

Other objects, features and advantages will occur from the following description of a preferred embodiment and the accompanying drawings, in which.

Figure 1:
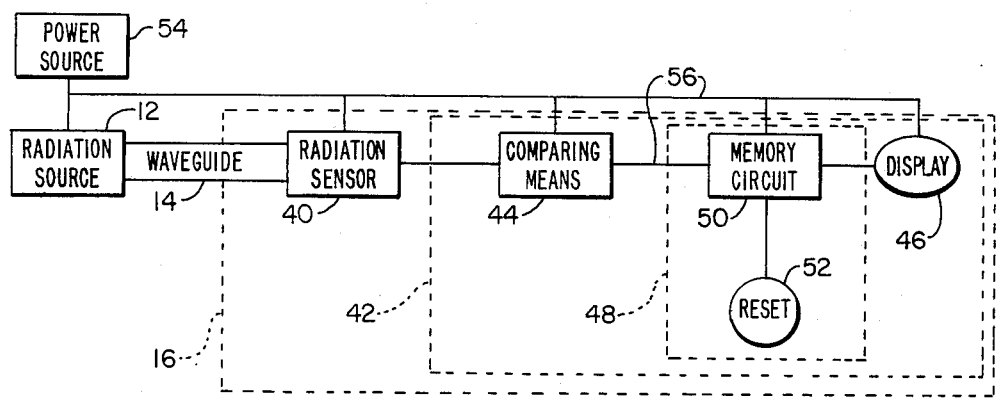
FIG. 1 is a functional block diagram of a fluid detecting system.

There is shown in FIG. 1 a fluid detector system 10 having a radiation source 12 which emits radiation in a plurality of modes, or ray angles, into optical waveguide 14. During operation of detector system 10, waveguide 14 is inserted into a medium containing at least a fluid whose level or condition is to be monitored. The modes interact with the medium at the boundary of waveguide 14 such that a given mode is either transmitted or totally internally reflected, depending upon certain properties of the one or more fluids within the medium. The amount of radiation flux remaining within waveguide 14 is detected by detecting means 16, which includes at least a radiation sensor 40. In one embodiment, detecting means 16 also includes means for determining 42 which determines when sensor signals from sensor 40 deviate from one or more predetermined values. Comparing means 44, display means 46, and memory means 48 of determining means 42 are described below. Power source 54 and connecting means 56 are also shown in FIG. 1 and described below.

Figure 2:
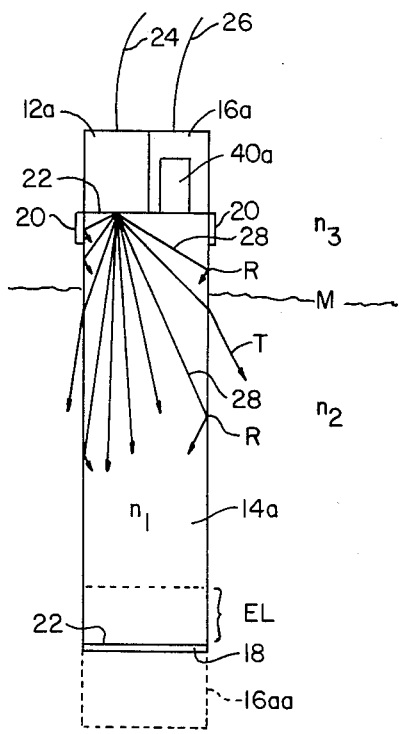
FIG. 2 is a schematic transverse view of a fluid detecting system, shown inserted into a medium including a fluid to be monitored.

There is shown in FIG. 2 a radiation source 12a, an optical waveguide 14a, and detecting means 16a. Radiation source 12a preferably emits a narrow waveband of radiation in visible or near-visible spectra having a plurality of modes 28 as depicted in FIG. 2. Each mode 28 is a ray of radiation with an emitted angle between 0° and 90° as it enters waveguide 14a. Medium M contains at least a first fluid having an index of refraction of $n_2$. The medium may include a second fluid having an index of refraction of $n_3$. For the invention to operate, the index of refraction $n_1$ of optical waveguide 14 must be greater than $n_2$ and greater than $n_3$. Where the first fluid is oil or a gas of organic elements of high molecular weight, and the second includes atmospheric gases, $n_2$ is greater than $n_3$. Alternatively, as when oil overlies a relatively non-miscible fluid of higher refractive index $n_2$ can be less than $n_3$. FIG. 2 depicts the former situation where $n_2$ is greater than $n_3$.

Detecting means 16a may consist essentially of radiation sensor 40a. The sensor may be located at the end of the waveguide opposite radiation source 12a as indicated by dashed line 16aa. Alternatively, sensor 40a may be mounted on the same end of the optical waveguide with optically reflective material 18 placed on the opposite end. Reflective material 18 should form a surface generally perpendicular to optical waveguide 14a. It is preferred that the surface be perpendicular so that each mode 28 is returned through waveguide 14a at the same angle. reflective material 18 may include a metallic foil or metal placed through evaporative deposition. The metal may be aluminum, silver, gold, titanium and aluminum, or titanium and silver, or any similar reflective material. To allow attachment of other elements to the optical waveguide, such as mounting means (not shown), an optically reflective collar 20 may be placed around the waveguide to prevent stripping of modes by the attachment. To prevent additional loss of modes, any attachment to the optical waveguide, such as of radiation source 12a, radiation source 40a, and reflector 18, should be made with an optically transparent epoxy 22 or other similar optically transparent mounting means. One such epoxy is EPO-TEK 301, manufactured by Epoxy Technology, Inc. Connection means, line 24, connects radiation source 12a with a power source, such as power source 54 in FIG. 1.

Connection means, line 26, connects this portion, radiation sensor 40a, of the detecting means to other remote portions. For example, line 26 may connect radiation sensor 40a with comparing means or display means, such as comparing means 44 and display means 46 shown in FIG. 1.

Figure 3:
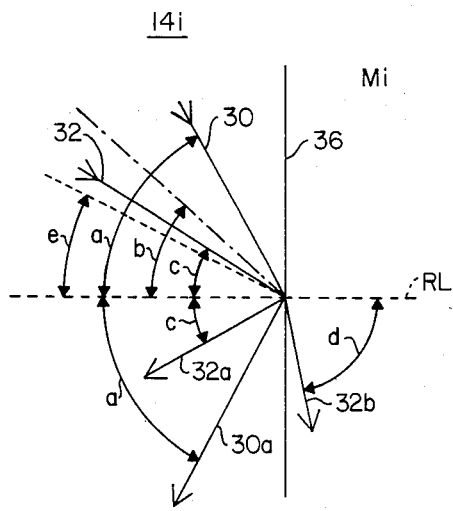
FIG. 3 is an illustration of the effect of critical angles on mode stripping.

Each mode 28 will be primarily transmitted T, and thereby stripped from waveguide 14a or reflected R after striking the boundary between the optical element 14a and the medium M, i.e. between $n_1$ and $n_2$ or between $n_1$ and $n_3$. To illustrate, the path of two modes 30 and 32 are shown in FIG. 3 as they strike boundary 36 between optical waveguide 14i and medium Mi. Using the dotted reference line RL, a normal, it can be seen that mode 30 has a large angle of incidence a and mode 32 has a smaller angle of incidence c. If the index of refraction of the medium, Mi, is that of $n_2$, it has a critical angle b, such that angle a is greater than critical angle b and angle c is less than critical angle b, where:

$$\sin b = n_2/n_1$$

When medium Mi has an index of $n_2$, mode 30 is totally internally reflected as indicated by ray 30a. Mode 32, however, is primarily transmitted and refracted by the medium, as shown by ray 32b. Ray 32b represents a mode that has been stripped from optical waveguide 14i. A minor portion of mode 32 is internally reflected as ray 32a, but this portion is proportionally diminished upon subsequent contacts, including contacts with a boundary on the opposite side (not shown) of optical waveguide 14i.

The portion of mode 32 that is transmitted through boundary 36, represented by 32b, has an angle of refraction d. According to Snell's Law:

$$n_1 \sin c = n_2 \sin d.$$

From Snell's Law it can be seen that the angle of refraction d is always greater than the angle of incidence c for a mode passing from a medium of higher index of refraction into one of smaller index, as from glass into oil, water, or air. There is also shown in FIG. 3 critical angle e which medium Mi can have when its index of refraction is $n_3$. In this situation both angles a and c are greater than the critical angle e and, therefore, both modes 30 and 32 are totally internally reflected.

Figure 4:
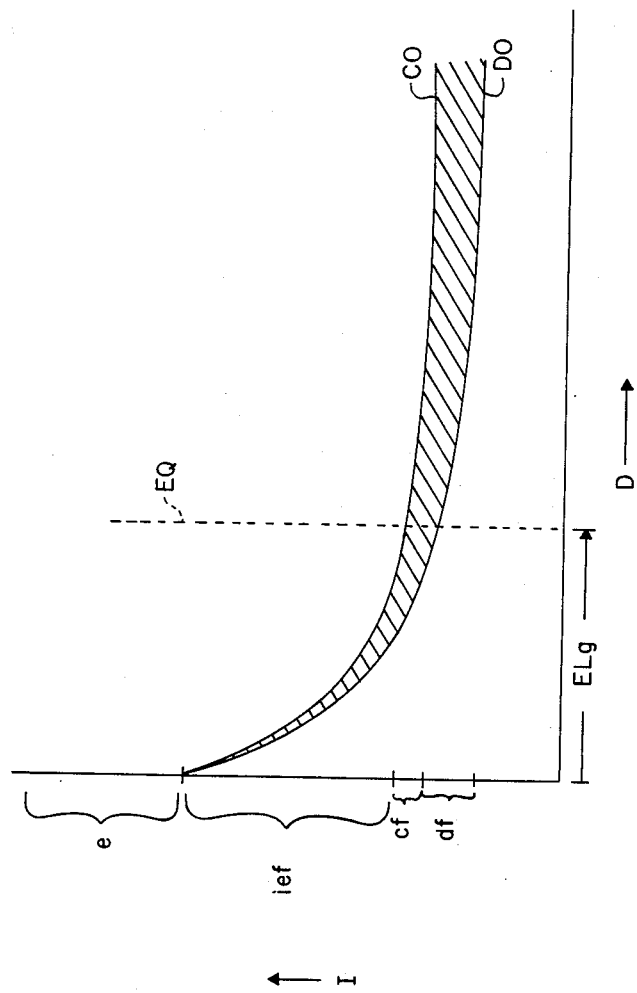
FIG. 4 is a graph of a curve representing intensity versus immersion distance.

Diminishing intensity of radiation flux remaining within the optical waveguide versus immersion distance is shown in FIG. 4, as the waveguide is immersed into a fluid having a higher index of refraction from a fluid having a lower index of refraction. For example, one curve may be generated as the waveguide is progressively immersed from air into clean oil, as shown by curve CO, and a second curve DO generated as the waveguide is immersed from air into dirty oil. It can be seen that the intensity drops sharply and then levels off as the waveguide is progressively immersed into the fluid. The initial decrease in intensity results from mode stripping as an ever-greater number of modes have the opportunity to encounter the boundary between the waveguide and the fluid having the higher index of refraction. Beyond a certain point, represented by the dashed line for equilibrium EQ, no further mode stripping occurs as long as the index of refraction of the higher-index fluid remains unchanged. A mode which is totally internally reflected when it strikes the boundary between the waveguide and a fluid having a higher index of refraction is totally internally reflected when it strikes the boundary between the waveguide and a fluid having a lower index of refraction. The distance required to reach the point of equilibrium EQ is represented by equilibration length ELg. Because the multi-mode radiation source emits a wide range of mode angles, each mode, having an angle of incidence greater than the critical angle for the fluid of higher index of refraction, repeatedly encounters the boundary between the waveguide and the medium such that, when the waveguide is immersed at or beyond equilibration length EL the mode is totally internally reflected whether it strikes the boundary between the waveguide and the fluid having the higher index of refraction, or strikes the boundary between the waveguide and the fluid of lower index of refraction before it reaches the radiation sensor.

There is shown in FIG. 2 an equilibration length EL, which is used when detecting system 10a detects fluid level. Equilibration length EL is calculated, for a medium having critical angles b and e as shown in FIG. 3, by $$EL = r(\tan b - \tan e)$$

where r is the radius of waveguide 14a and $n_1$ is greater than $n_2$ which is greater than $n_3$. The angles b and e may be calculated by $$b = \arcsin n_2/n_1, \text{ and}$$

$$e = \arcsin n_3/n_1.$$

Intensity continues to decline, though at a far slower rate, as the waveguide is immersed further into the fluid. The decline beyond equilibrium EQ as shown in FIG. 4 results from the evanescent wave effect, in which part of the energy of each totaly internally reflected mode is absorbed into the medium. The higher the optical absorption coefficient of the fluid, the greater the evanescent losses. The evanescent wave effect is present along the entire length of the immersion curve, but increases in significance as a greater portion of the waveguide becomes immersed in fluid. As fluid becomes contaminated, radiation flux is lost both due to an increase in the index of refraction and thus decrease in the critical angle, allowing greater mode stripping, and due to increased evanescent losses resulting from a rise in the optical absorption coefficient. These effects comprise the complex index of refraction. Dirty oil, especially diesel oil contaminated with colloidal carbon, has a much higher optical absorption coefficient than clean oil. The difference in absorption for a given immersion distance is reflected by the hatched area between curves CO and DO.

When fluid level is to be monitored the greatest change in fluid level is detected over equilibration length ELg. When the detector system is used only for level detection, the outer surface of the waveguide may be covered with an optically reflective material up to equilibration length ELg. For a cylindrical glass waveguide of radius one eighth inch, the equilibration length is approximately 0.18 inch when the waveguide is F2 glass, NATO Code #620364, having an $n_1$ of 1.62, the first fluid is oil having an $n_2$ of 1.48, and the second fluid is air with an $n_3$ of 1.0.

When the detector is used to detect fluid condition, such as a decrease in quality as the concentration of contaminants increases in a fluid, the fluid must cover at least a portion of the waveguide. The optical waveguide is then most effective when inserted at a depth equal to or beyond equilibration length ELg.

In one embodiment of a combined fluid level and condition detector system, intensity zones e, ief, cf and df, as shown on the y axis of FIG. 4, may be perceived by determining means 42, FIG. 1. For high intensities, zone e, the determining means of the detector can indicate an empty condition, that is, where the fluid to be monitored is absent from the waveguide and the waveguide is instead covered by a second fluid having a smaller index of refraction. A level intermediate to empty and full, zone ief, is detected when the waveguide is partially covered both by the first fluid and the second fluid. If the determining means is calibrated to determine satisfactory fluid level at an immersion distance beyond equilibrium EQ, the clean-full intensity level, zone cf, indicates that the first fluid is clean and covers all of the equilibration length of the waveguide. Dirty-full, zone df, intensity then represents a further decrease in intensity due to the combined effects of mode stripping due to an increase in index of refraction and an increase in evanescent losses due to increase in the optical absorption coefficient. The detecting means may include display means for indicating at least these four conditions.

If a fluid to be monitored has a lower index of refraction than a second fluid then the changes in intensity would reflect an opposite change in the fluid. In other words, empty, zone e, would indicate that the fluid to be monitored covered all of the equilibration length ELg, while the clean-full, zone cf, would indicate that the second fluid of higher index of refraction was covering the equilibration length. Also, the dirty oil curve DO could represent a normal condition of a fluid. The fluid condition detector system could then detect a decrease in the optical absorption coefficient as the fluid is diluted or otherwise altered.

A preferred optical waveguide is F2 glass. The optical attenuation of radiation transmitted within the waveguide is low enough to permit most of the internally reflected radiation flux to reach the radiation sensor. The index of refraction of the glass $n_1$ compared to that of the medium provides a light piping effect due to total internal reflection. The $n_1$ of other suitable waveguiding materials may range from 1.40 to 1.8 depending upon the fluid to be monitored. However, for fluids of higher index of refraction a waveguide having an $n_1$ outside this range can be selected. Waveguides containing quartz may have an $n_1$ as low as 1.4. The $n_1$ for F2 glass is approximately 1.62. Where $n_1$ of the fluid to be monitored in the medium varies only slightly, $n_1$ of the glass may be close to that of the medium. For example, gasoline engine oil exhibits a small change as it progresses from clean to contaminated, and never rises far beyond an $n_2$ of 1.485. In that case, flint glass having an $n_1$ of approximately 1.5 may be used. For diesel oil, however, $n_1$ of the glass must be farther above the oil because $n_2$ of the diesel oil rises above 1.5.

A preferred light source is an LED of gallium arsenide. It is important to select a wavelength that minimizes absorption by the optical waveguide. The gallium arsenide emission wavelength of 0.9 microns satisfies this requirement for F2 glass.

The choice of radiation sensor depends upon the application. If sensitivity is required, that is, low levels of returned signals must be detected, then two silicon phototransistors in a photodarlington arrangement may be used to sense radiation from about one micron through the visible range of radiation. Honeywell currently produces three such packages which also include a light source, sold as SPX 1397-31, -32, or -34. These are also known as reflective opto-electric switches. If such sensitivity is not required, then F2 glass may be used along with a single phototransistor, and the Honeywell SPX 1397-1, -2, or -4 may be used. These also include a radiation source as well as a radiation sensor. For detecting heavily contaminated diesel oil containing approximately 3% carbon by weight, F2 glass in combination with a simple phototransistor may be used.

As shown in FIG. 1, determining means 42 is responsive to sensor 40 and may include comparing means 44 for comparing the signal from sensor 40 with a predetermined value. A change in fluid level or condition is determined when the sensor signal deviates from the predetermined value. If detector system 10 is to monitor the level of a fluid and that fluid has a higher index of refraction than a second fluid in the medium into which the optical waveguide is inserted, the comparing means determines when the sensor signal exceeds a high value. Detecting means 16 may also include display means 46 for indicating the result of the comparison. Comparing means 44 compares the sensor signal with a low value to determine when the fluid having the higher index of refraction totally covers the equilibration length. Comparing means 44 may also compare the sensor signal with the high value and the low value to determine an intermediate level of the fluid due to partial coverage of the equilibration length by that fluid. Display means 46 may include two lights or other similar indicators, one displaying a full level and the other indicating a low level. With three lights the display means may indicate full level, intermediate level, or low level. As an alternative to a light display, the display means in another embodiment includes a voltmeter or other analog display, while the determining means does not include comparing means 44 such that the display means is directly responsive to sensor 40. Or, comparing means 44, such as indications on the display, may be included.

For a fluid condition detector system, comparing means 44 compares the sensor signal with a low value. The low value represents the decrease in radiation flux within waveguide 14a due to an increase in the index of refraction, resulting in mode stripping, and the increase in the absorption coefficient of the fluid, resulting in evanescent wave losses. Display means 46 could similarly include one or more indicators to indicate a radiation flux due to a desired index of refraction and absorption coefficients in the fluid, a slight loss of radiation flux such as when the fluid to be monitored is slightly contaminated, or a large loss of radiation flux such as when the fluid is heavily contaminated.

In a preferred embodiment, fluid detector system 10 detects both fluid level and fluid condition. Detecting means 16 detects the difference, due to mode stripping resulting from a change in the index of refraction, in radiation flux transmitted by the waveguide with the waveguide covered by the fluid to be monitored over the equilibration length, with waveguide 14 covered by the second fluid of lower index of refraction over the equilibration length, and with waveguide 14 covered partially by each fluid over the equilibration length, and also for detecting the difference in radiation flux transmitted by waveguide 14 due to the combined effects of mode stripping resulting from a change in index of refraction and of evanescent losses resulting from a change in optical absorption coefficient of the first fluid covering at least a portion of waveguide 14.

Detecting means 16 of the combined fluid level and condition detector system may include determining means 42, which may include comparing means 44, display means 46, or both. Comparing means 44 compares sensor signals with a high value and a low value. Display means 46 indicates an unsatisfactory level of a first fluid when the sensor signal exceeds the high value, indicating that the second fluid covers the equilibration length. Display means 46 also indicates an unsatisfactory condition of the first fluid when the sensor signal is less than the low value, indicating both an increase in the index of refraction and in the absorption coefficient of the first fluid. Determining means 42 in the fluid level detector system, the fluid condition detector system, and in the combined fluid level and condition detector system, may include memory means 48 responsive to comparing means 44, for storing the level or condition sensed. Memory means 48 may include a solid state memory 50 and may also include reset means 52 for clearing memory 50. There is also shown in FIG. 1 power source 54 and its connecting means 56.

Figure 5:
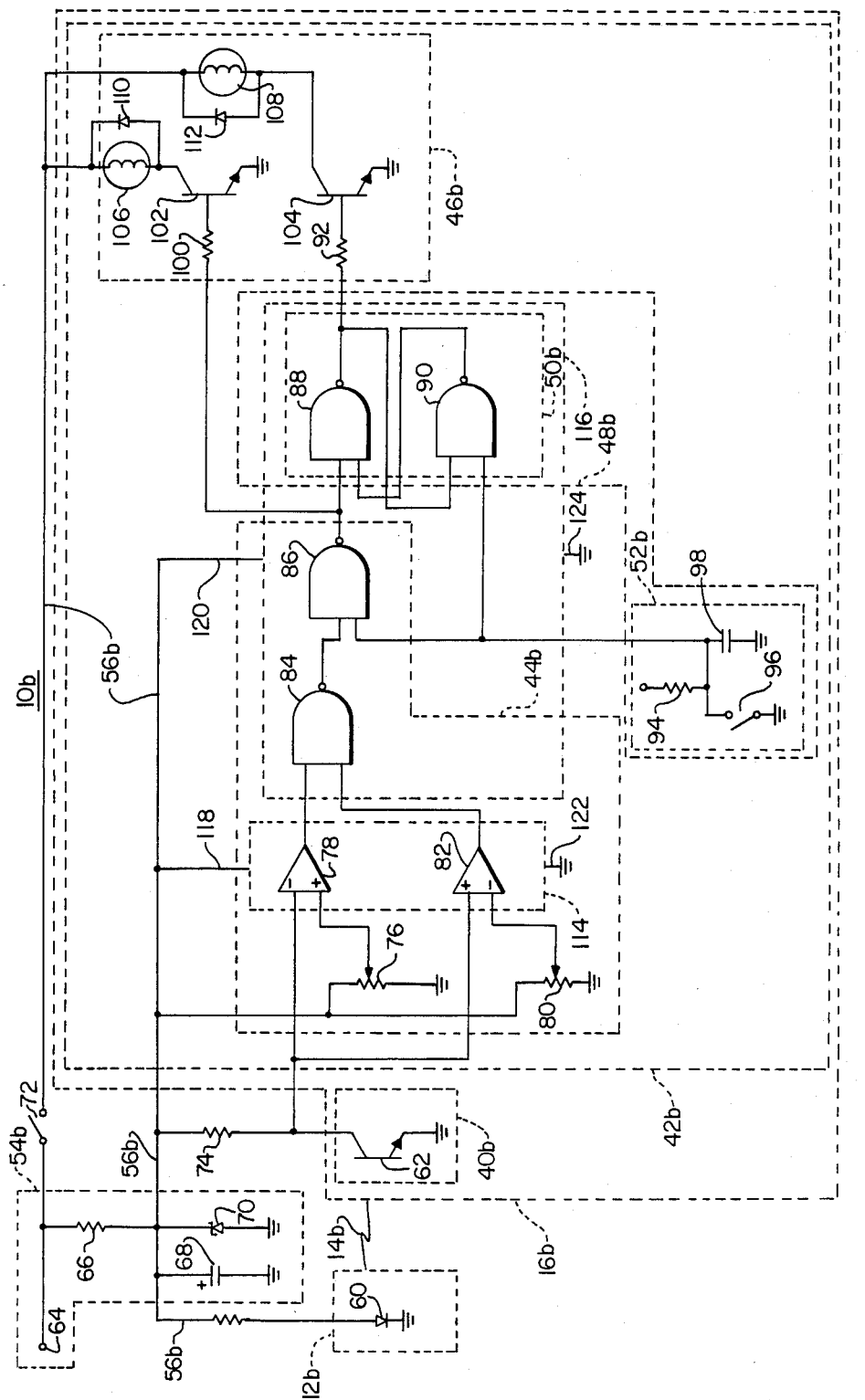
FIG. 5 is a schematic view of a detector system including circuitry for bistate display.

Fluid detector system 10b, shown in FIG. 5, monitors fluid level, fluid condition, or both. Radiation source 12b emits radiation into optical waveguide 14b, shown schematically. Radiation flux remaining within waveguide 14b is detected by detecting means 16b. Radiation source 12b contains a light-emitting diode 60 and detecting means 16b includes a radiation sensor 40b containing a phototransistor 62. Detecting means 16b, as shown, includes determining means 42b, which includes comparing means 44b, memory means 48b, and display means 46b. Detector system 10b. may include a power source 54b, which may include a battery 64, such as an automobile battery, resistor 66, capacitor 68, and a voltage regulator such as zener diode 70. Power source 54b provides a regulated voltage to radiation source 12b and detecting means 16b. If detector system 10b operates within an automobile, the system may be provided with a switch 72, such as the ignition switch of an automobile, to deprive display means 46b of power when the automobile is not in use. In one embodiment, memory means 48b stores the detected fluid state and reactivates display means 46b when switch 72 is closed. This allows the driver of the automobile to learn the state of the fluid, such as engine oil, when the electrical system is activated but before the engine is started. Resistor 74 limits the current passing through phototransistor 62. Comparing means 44b includes variable resistor 76, set to provide a high reference voltage to comparator 78, and variable resistor 80, set to provide a low reference voltage to comparator 82. The voltage controlled by phototransistor 62 defines the sensor signal. This voltage is applied to the negative sense input of comparator 78 and to the positive sense input of comparator 82. The outputs of comparators 78 and 82 are received by NAND gate 84. When both inputs are at a logic "1", or high, level, the output of NAND gate 84 is at a logic level "0", or low. Any other combinations of inputs cause the output of NAND gate 84 to be at logic level "1". Variable resistors 76 and 80, comparators 78 and 82, and gate 84 function as a double-ended limit detector in detector system 10b.

When fluid detector system 10b is used to monitor engine oil, the input signal voltage to comparators 78 and 82 is below the low reference voltage set by variable resistor 80 and the output of NAND gate 84 is at logic "1" when the fluid level is low. Note that when the fluid level is low, the radiation flux in waveguide 14b is high; however, phototransistor 62 sends the voltage between resistor 74 and comparators 78 and 82 to a low level. Conversely, when the radiation flux within optical waveguide 14b is low, such as when contaminated oil surrounds a portion of the waveguide, the voltage between resistor 74 and the comparators will be high. When the signal from sensor 62 is between the reference voltages set by resistors 76 and 80, the output of NAND gate 84 is at a logic level "0". When the input to the comparators is above the high reference voltage set by resistor 76, the output of NAND gate 84 is logic "1".

Determining means 42b defaults to a satisfactory condition unless the fluid level is low or the condition is contaminated. NAND gate 86 acts as an inverter when reset switch 96 of reset means 52b is not activated. Memory circuit 50b contains NAND gates 88 and 90 in a bistable flip-flop configuration. When the output of NAND gate 86 is at a logic "0", the junction of flip-flop 50b and resistor 92 is forced to logic level "1", thereby turning on driver 104. When the output of gate 86 returns to logic "1", the condition of flip-flop 50b remains at logic "1" unless flip-flop 50b is reset. Resistor 94 forces, or pulls up, the reset input of flip-flop 50b via NAND gate 90 and the input of NAND gate 86, until switch 96 is activated by closure. The reset voltage input of gate 86 and flip-flop 50b upon activation of switch 96 is set to logic "0". This action resets flip-flop 50b to logic "0" and forces the output of gate 86 to a high condition. Filter capacitor 98 prevents voltage transients indirectly caused by the activation or deactivation of reset switch 96 from inadvertently resetting flip-flop 50b.

Resistors 100 and 92 limit the current into the base of display drivers 102 and 104. These NPN transistors drive display lamps 106 and 108. A pair of damping diodes 110 and 112 minimizes voltage transients created when display lamps 106 and 108˙ are extinguished, thereby preventing any damage to the lamp drivers 102 and 104.

When the waveguide 14b is surrounded by a low level of the fluid to be monitored, lamp 108 turns on when driver 104 is turned on and lamp 106, which had previously indicated a full condition, turns off as the junction of gate 86, resistor 100 and driver 102 drops to a low voltage. When the fluid to be monitored surrounding a portion of waveguide 14b is contaminated, lamp 108 again turns on and lamp 106 turns off. Lamps 106 and 108 may be LEDs typically requiring approximately ten to twenty milliamps of power to turn on, or incandescent bulbs typically requiring about eighty milliamps. In one embodiment lamp 106 is green to indicate a full and clean condition, for example, and lamp 108 is red to indicate a low or contaminated condition.

Voltage comparators 78 and 82 and NAND gates 84, 86, 88 and 90 are conventional components. Dashed line 114 indicates the chip on which the comparators may be located, and dashed line 116 indicates the chip on which the NAND gates may be located. Voltage inputs 118, 120 and grounds 122, 124 are shown in FIG. 5 for these chips.

Figure 6:
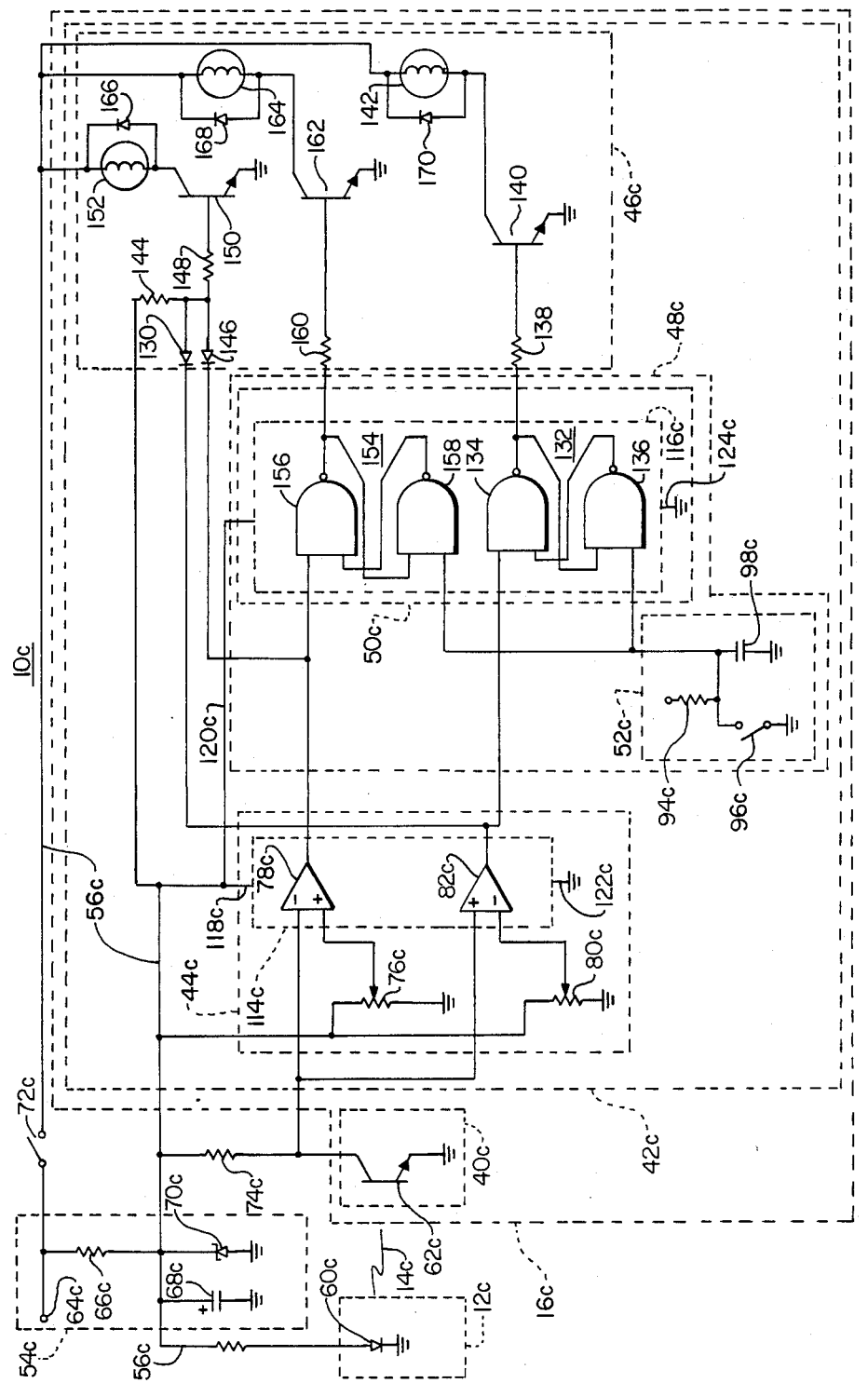
FIG. 6 is a similar representation including circuitry for a tristate display.

Fluid detector system 10c, shown in FIG. 6, independently displays a low fluid level and a contaminated fluid condition. The following elements function similarly to those described for FIG. 5: light-emitting diode 60c in radiation source 12c; phototransistor 62c in radiation sensor 40c; voltage source 64c, resistor 66c, filter capacitor 68c, and voltage regulator 70c of power source 54c; and reset switch 96c, pullup resistor 94c, and capacitor 98c of reset means 52c. Switch 72c may be used to turn off display lights when not in use. Resistor 74c again works in conjunction with phototransistor 62c to provide sensor signal voltage to comparators 78c and 82c. Resistor 76c provides a high reference voltage, and variable resistor 80c provides a low reference voltage. However, the remainder of determining circuit 42c differs because the outputs of comparators 78c and 82c are now treated independently. When waveguide 14c transmits a large amount of radiation flux to phototransistor 62c, and the sensor signal falls below the low reference level of 80c, typically 1.5 volts, the output of voltage comparator 82c falls to logic level "0", reflecting the low fluid level. The low voltage level at the junction of comparator 82c, diode 130 and flip-flop 132 causes the junction of flip-flop 132 and then resistor 138 into a logic level "1", thereby turning transistor 140 on and activating display 142. Flip-flop 132 is formed from NAND gates 134 and 136. This state also puts junction of diode 130, resistor 144, diode 146 and resistor 148 into a low-level condition. When the junction of resistor 148 and transistor 150 is at a low level, display light 152 is extinguished. The extinguishing of light 152 and illumination of light 142 indicates a low fluid condition. If the level of the fluid around the portion of waveguide 14c subsequently rises, output of comparator 82c will also rise to logic level "1", but the state of flip-flop 132 does not change until reset switch 96c of reset means 52c is activated.

When the sensor signal input to voltage comparator 78c exceeds the high reference voltage as delineated by variable resistor 76c, the output of comparator 78c drops to logic "0", which reflects a contaminated fluid condition. Logic level "0" at the junction of comparator 78c, diode 146, and flip-flop 154 of memory means 50c causes the junction of flip-flop 154 and resistor 160 to logic level "1", which turns transistor 162 on, thereby illuminating display light 164. Flip-flop 154 is formed from NAND gates 156 and 158. Display light 152 is simultaneously extinguished as driver 150 is turned off. Extinguishing of lamp 152 and illumination of lamp 164 indicates a contaminated fluid condition. Conversely, if the quality of the liquid is improved, for example by dispersion of clean fluid with the contaminated fluid or by replacement, such that the index of refraction is lowered, the optical absorption coefficient is lowered, or both, the sensor output of phototransistor 62c drops below the high reference voltage of variable resistor 76c. Comparator 78c rises to logic level "1", while flip-flop 154 remains unchanged until reset.

For practical implementation, display lights 152, 164 and 142 have damper diodes 166, 168 and 170 to reduce voltage transients created by inductance. Dashed lines 114c and 116c represent the chips for the comparators of comparing means 44c and the NAND gates used in memory means 50c. Voltage inputs 118c and 120c, and grounds 122c and 124c are shown for these chips.

Other embodiments will occur to those skilled in the art and are within the following claims:

What is claimed is:
1. A fluid level detector system comprising:
a multimode optical waveguide for insertion into a medium including at least a first fluid whose level is to be monitored, said waveguide having an equilibration length beyond which no further mode-stripping occurs;
a source of radiation for introducing into one end of said waveguide radiation in a plurality of modes; and
means for detecting changes, due to mode stripping resulting from a change in the index of refraction, in radiation flux transmitted by said waveguide with the waveguide covered by said first fluid over its equilibration length, with the waveguide covered by a second fluid of lower index of refraction over its equilibration length, and with the waveguide covered partially by each fluid over its equilibration length to determine changes in fluid level.

2. The level detector system of claim 1 in which the detecting means includes a radiation sensor.

3. The level detector system of claim 2 in which the detecting means includes means for determining signals from the radiation sensor deviating from at least one predetermined value.

4. The level detector system of claim 3 in which the predetermined value is a high value and the determining means includes means for comparing sensor signals with the high value.

5. The level detector system of claim 4 in which the determining means includes display means for indicating an unsatisfactory level of the first fluid when the sensor signal, due to coverage of the equilibration length by the second fluid, exceeds the high value.

6. The level detector system of claim 4 in which the comparing means also compares sensor signals with a low predetermined value.

7. The level detector system of claim 6 in which the determining means includes display means for indicating:
a full level of the first fluid when the sensor signal, due to coverage of the equilibration length by the first fluid, is less than the low value; and
an intermediate level of the first fluid when the sensor signal, due to partial coverage of the equilibration length by the first fluid, is between the high value and the low value.

8. The level detector system of claim 3 in which the determining means includes a memory for storing the level sensed.

9. The level detector system of claim 1 in which the optical waveguide includes glass.

10. The level detector system of claim 9 in which the glass has an absolute refractive index of 1.40 to 1.8 for sodium light of frequency 5893 angstroms.

11. The level detector system of claim 1 in which the radiation source emits radiation having a wavelength selected from the spectra consisting of visible and near-visible radiation.

12. The level detector system of claim 11 in which the radiation source is a light-emitting diode.

13. The level detector system of claim 1 in which the outer surface of the optical waveguide is coated at the end proximate the radiation source with optically reflective material.

14. The level detector system of claim 2 in which the radiation sensor includes at least one photoelectric element.

15. The level detector system of claim 14 in which the radiation sensor includes at least one phototransistor.

16. The level detector system of claim 2 in which the radiation source and the radiation sensor are mounted at one end of the optical waveguide, said waveguide having optically reflective material mounted at the opposite end.

17. The level detector system of claim 1 in which the first fluid is engine oil and the second fluid includes atmospheric gases above the oil.

18. A fluid condition detector system comprising:
a multimode optical waveguide for insertion into a medium including a fluid whose condition is to be monitored;
a source of radiation for introducing into one end of said waveguide radiation in a plurality of modes; and
means for detecting a change in radiation flux transmitted by said waveguide due to combined effects of mode stripping resulting from a change in index of refraction and of evanescent losses resulting from a change in optical absorption coefficient of the fluid covering at least a portion of said waveguide to determine a change in fluid condition.

19. The condition detector system of claim 18 in which the detecting means includes a radiation sensor.

20. The condition detector system of claim 19 in which the detecting means includes a means for determining signals from the radiation sensor deviation from a predetermined value.

21. The condition detector system of claim 20 in which the predetermined value is a low value and the determining means includes means for comparing sensor signals with the low value.

22. The condition detector system of claim 21 in which the determining means includes display means for indicating an unsatisfactory condition of the fluid when the sensor signal, due to an increase in the index of refraction and in the absorption coefficient of the fluid, is less than the low value.

23. The condition detector system of claim 20 in which the determining means includes a memory for storing the condition sensed.

24. The condition detector system of claim 18 in which the optical waveguide includes glass.

25. The condition detector system of claim 24 in which the glass has an absolute refractive index of 1.40 to 1.8 for sodium light of frequency 5893 angstroms.

26. The condition detector system of claim 18 in which the radiation source emits radiation having a wavelength selected from the spectra consisting of visible and near-visible radiation.

27. The condition detector system of claim 26 in which the radiation source is a light-emitting diode.

28. The condition detector system of claim 18 in which the outer surface of the optical waveguide is coated at the end proximate the radiation source with optically reflective material.

29. The condition detector system of claim 19 in which the radiation sensor includes at least one photoelectric element.

30. The condition detector system of claim 29 in which the radiation sensor includes at least one phototransistor.

31. The condition detector system of claim 19 in which the radiation source and the radiation sensor are mounted at one end of the optical waveguide, said waveguide having optically reflective material mounted at the opposite end.

32. The condition detector system of claim 18 in which the fluid to be monitored is engine oil.

33. A fluid level and condition detector system comprising:
a multimode optical waveguide for insertion into a medium including at least a first fluid whose level is to be monitored, said waveguide having an equilibration length beyond which no further mode-stripping occurs;
a source of radiation for introducing into one end of said waveguide radiation in a plurality of modes; and
means for detecting changes, due to mode stripping resulting from a change in the index of refraction, in radiation flux transmitted by said waveguide with the waveguide covered by said first fluid over its equilibration length, with the waveguide covered by a second fluid of lower index of refraction over its equilibration length, and with the waveguide covered partially by each fluid over its equilibration length to determine changes in fluid level and for detecting a change in radiation flux transmitted by said waveguide due to combined effects of mode stripping resulting from a change in index of refraction and of evanescent losses resulting from a change in optical absorption coefficient of the first fluid covering at least a portion of said waveguide to determine a change in fluid condition.

34. The level and condition detector system of claim 33 in which the detecting means includes a radiation sensor.

35. The level and condition detector system of claim 34 in which the detecting means includes means for determining signals from the radiation sensor deviating from at least one predetermined value.

36. The level and condition detector system of claim 35 in which the determining means includes means for comparing sensor signals with a high predetermined value and a low predetermined value.

37. The level and condition detector system of claim 36 in which the determining means includes display means for indicating:
an unsatisfactory level of the first fluid when the sensor signal, due to coverage of the equilibration length by the second fluid, exceeds the high value; and
an unsatisfactory condition of the first fluid when the sensor signal, due to an increase in the index of refraction and in the absorption coefficient of the first fluid, is less than the low value.

38. The level and condition detector system of claim 33 in which the optical waveguide includes glass.

39. The level and condition detector system of claim 33 in which the radiation source emits radiation having a wavelength selected from the spectra consisting of visible and near-visible radiation.

40. The level and condition detector system of claim 34 in which the radiation sensor includes at least one photoelectric element.

41. The level and condition detector system of claim 34 in which the radiation source and the radiation sensor are mounted at one end of the optical waveguide, said waveguide having optically reflective material mounted at the opposite end.

42. The level and condition detector system of claim 33 in which the first fluid is engine oil and the second fluid includes atmospheric gases above the oil.

43. A method of detecting fluid level comprising:
inserting a multimode optical waveguide, having an equlibration length beyond which no further mode stripping occurs, into a medium including at least a first fluid whose level is to be monitored;

introducing radiation into one end of said waveguide in a plurality of modes; and detecting changes, due to mode stripping resulting from a change in the index of refraction, in radiation flux transmitted by said waveguide with the waveguide covered by said first fluid over its equilibration length, with the waveguide covered by a second fluid of lower index of refraction over its equilibration length, and with the waveguide covered partially by each fluid over its equilibration length to determine changes in fluid level.

44. A method of detecting fluid condition comprising:

inserting a multimode optical waveguide into a medium including at least a first fluid whose level is to be monitored;

introducing radiation into one end of said waveguide in a plurality of modes; and detecting a change in radiation flux transmitted by said waveguide due to the combined effects of the mode stripping resulting from a change in index of refraction and evanescent losses resulting from a change in optical absorption coefficient of the fluid covering at least a portion of said waveguide to determine a change in fluid condition.

45. A method of detecting fluid level comprising:

inserting a multimode optical waveguide, having an equilibration length beyond which no further mode stripping occurs, into a medium including at least a first fluid whose level is to be monitored;

introducing radiation into one end of said waveguide in a plurality of modes; and detecting changes, due to mode stripping resulting from a change in the index of refraction, in radiation flux transmitted by said waveguide with the waveguide covered by said first fluid over its equilibration length, with the waveguide covered by a second fluid of lower index of refraction over its equilibration length, and with the waveguide covered partially by each fluid over its equilibration length to determine changes in fluid level; and detecting a change in radiation flux transmitted by said waveguide due to the combined effects of the mode stripping resulting from change in index of refraction and evanscent losses resulting from change in optical absorption coefficient of the first fluid covering at least a portion of said waveguide to determine a change in fluid condition.

* * * * *